July 8, 1924.

A. G. HOOVENS 1,500,936

MACHINE FOR MANUFACTURING WIRE CABLE

Filed Sept. 24, 1923    6 Sheets-Sheet 1

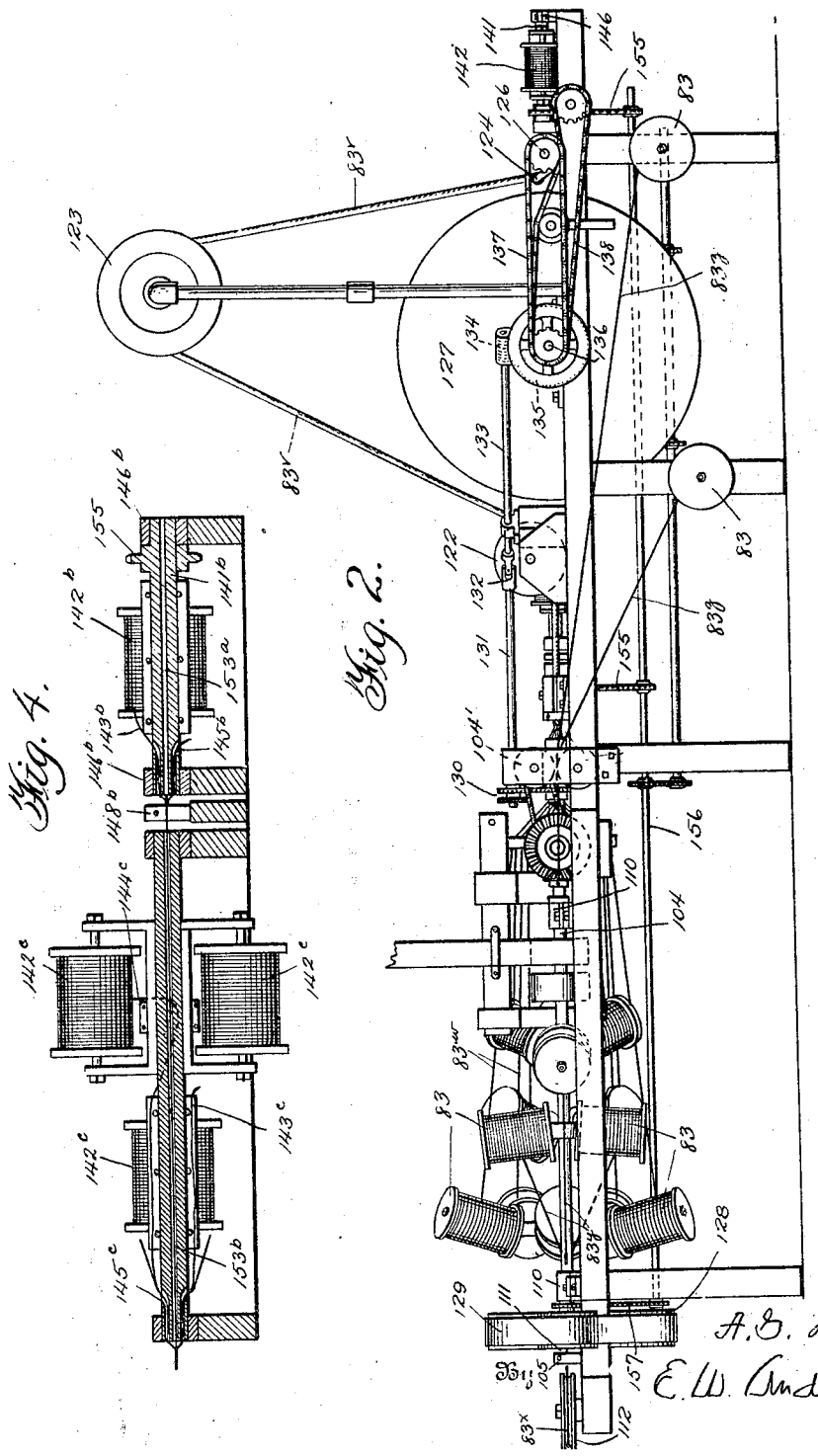

July 8, 1924.
A. G. HOOVENS
1,500,936
MACHINE FOR MANUFACTURING WIRE CABLE
Filed Sept. 24, 1923   6 Sheets-Sheet 3
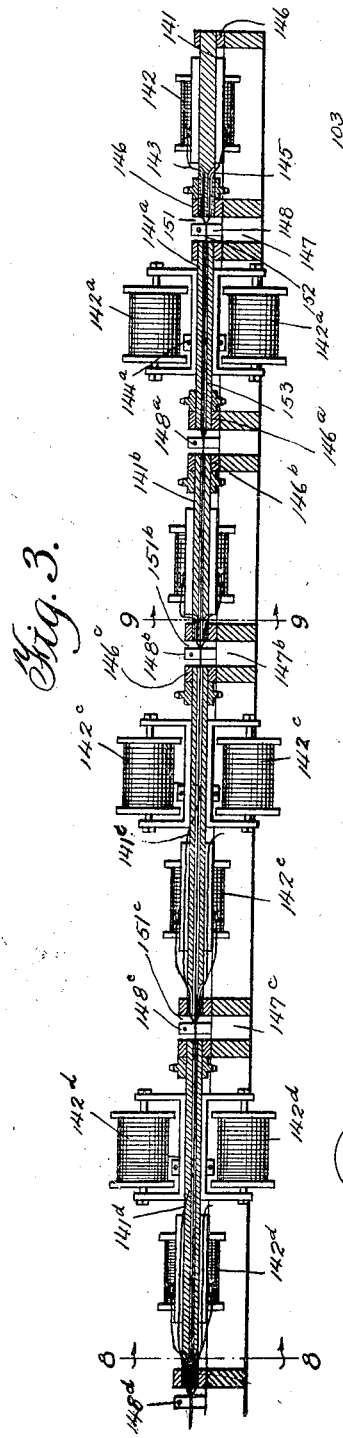
Inventor
A. G. Hoovens.
By E. W. Anderson
Attorney

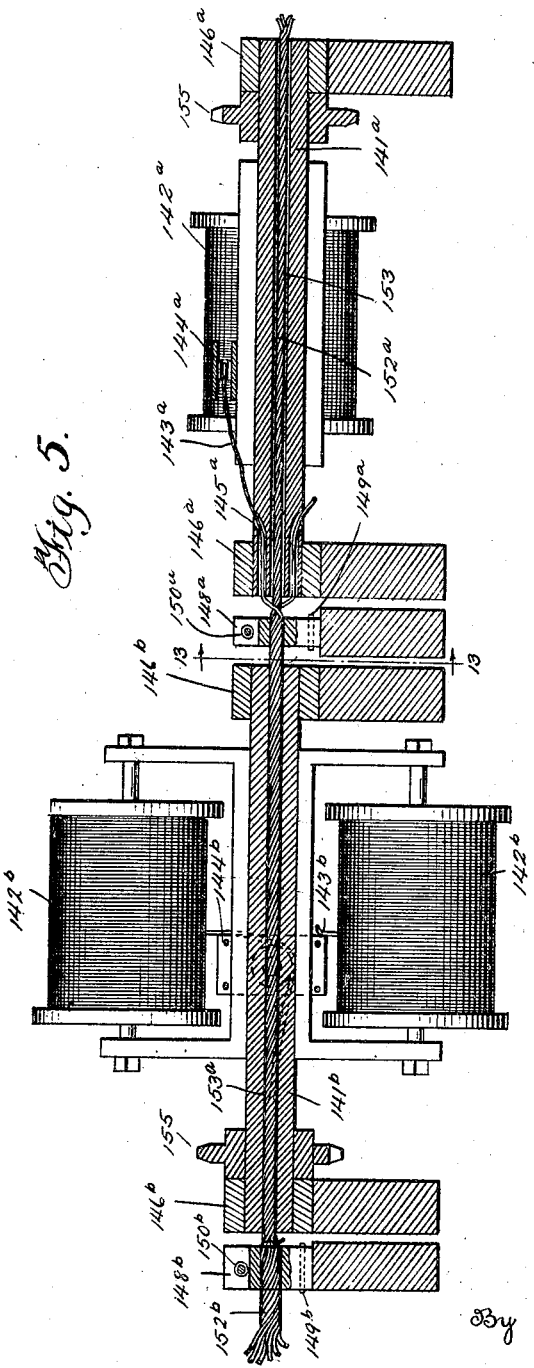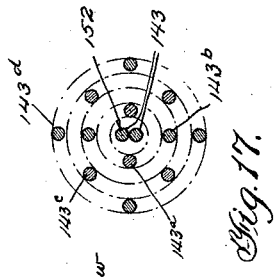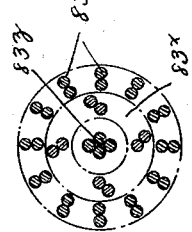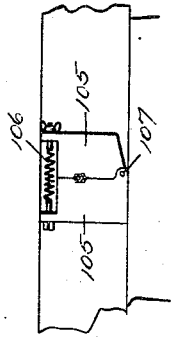

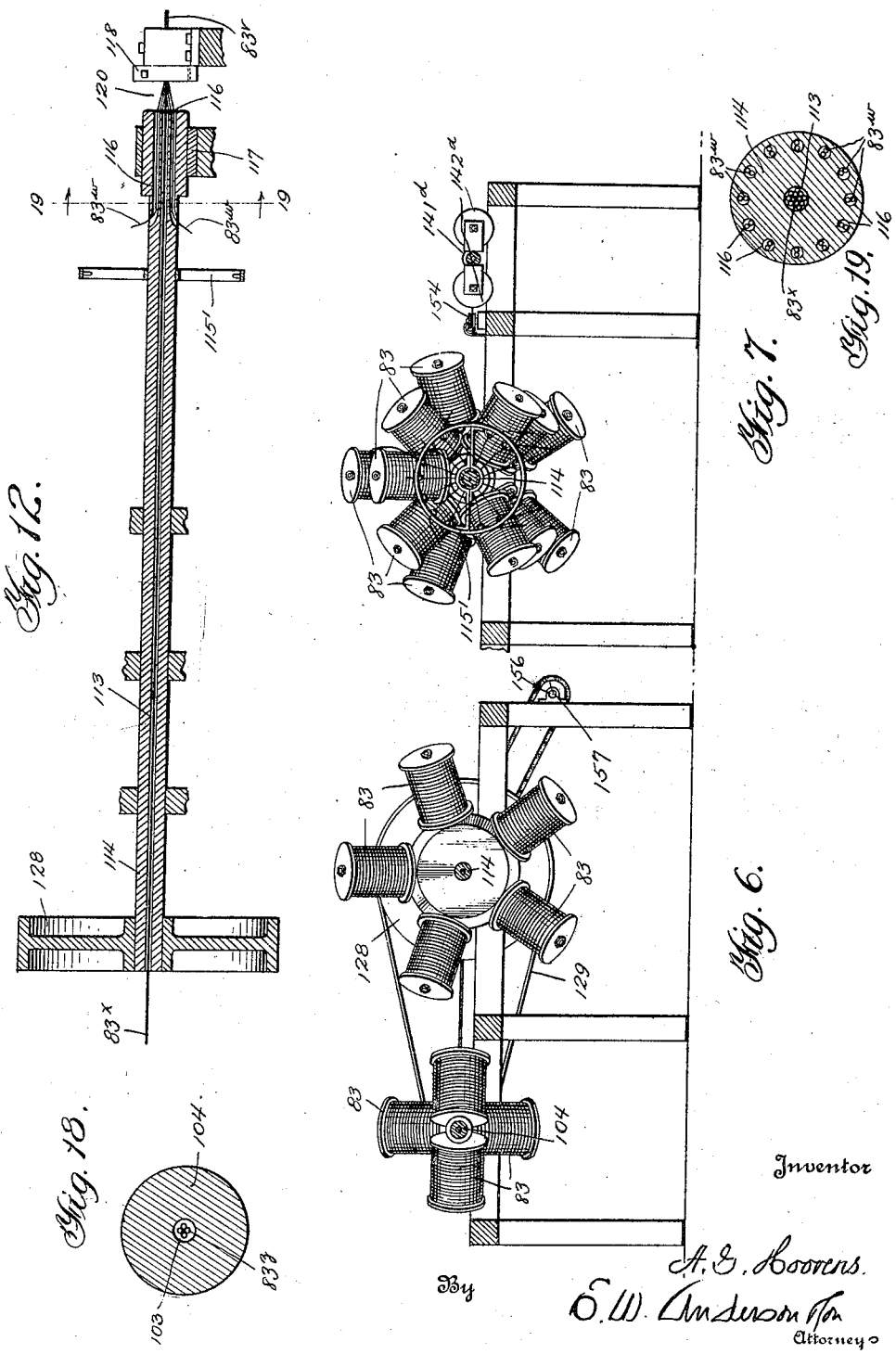

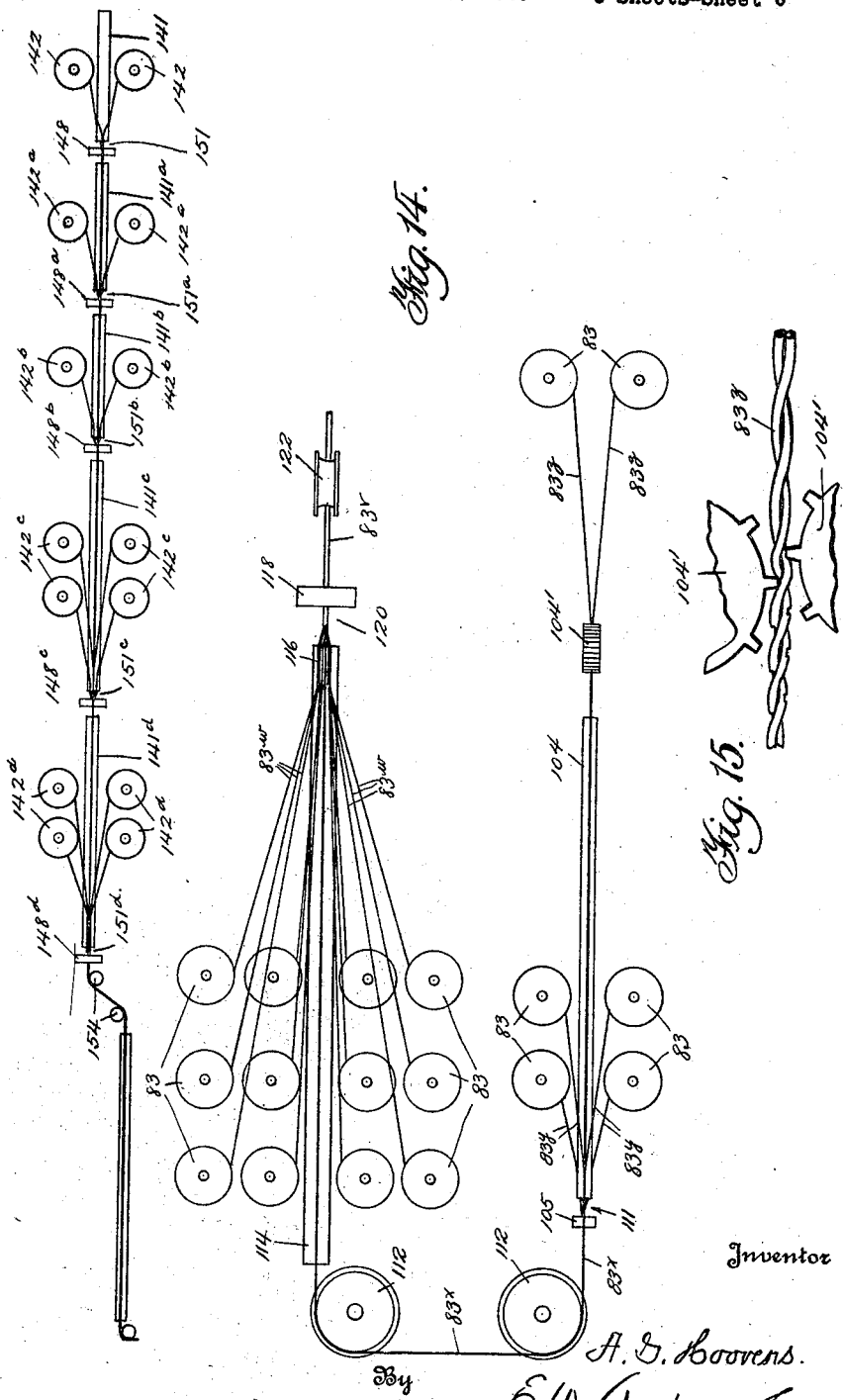

Patented July 8, 1924.

UNITED STATES PATENT OFFICE.

AMASA G. HOOVENS, OF GOSHEN, INDIANA.

MACHINE FOR MANUFACTURING WIRE CABLE.

Application filed September 24, 1923. Serial No. 664,455.

*To all whom it may concern:*

Be it known that I, AMASA G. HOOVENS, a citizen of the United States, residing at Goshen, in the county of Elkhart and State of Indiana, have made a certain new and useful Invention in Machines for Manufacturing Wire Cable, of which the following is a specification.

The invention has relation to machines for manufacturing wire cable of that species designed for use as a lightning conductor in the protection of buildings, the present invention being concerned with the third and last step of said manufacture, wherein a plurality of wire strands or subsidiary ropes or cables fed from take-off spools, are brought together and twisted around a core strand or subsidiary rope, the latter also fed from a take-off spool, to thereby form the complete cable, and the latter is wound upon a receiving drum.

The invention consists in the novel construction and combination of parts, as hereinafter set forth.

In the accompanying drawings illustrating an embodiment of the invention,

Figure 1 is a plan view of the invention.

Figure 2 is a side view of the same.

Figure 3 is a central longitudinal section of a portion of the invention, on the line 3—3, Figure 1.

Figure 4 is a detail sectional view of a portion of the showing of Figure 3, on a larger scale.

Figure 5 is a similar view on a still larger scale.

Figure 6 is a cross section on the line 6—6, Figure 1.

Figure 7 is a cross section on the line 7—7, Figure 1.

Figure 8 is a section on the line 8—8, Figure 3.

Figure 9 is a section on the line 9—9, Figure 3.

Figure 10 is a section on the line 10—10, Figure 1.

Figure 11 is a section on the line 11—11, Figure 10.

Figure 12 is a section on the line 12—12, Figure 1.

Figure 13 is a section on the line 13—13, Figure 5.

Figure 14 is a diagrammatic plan view of the invention.

Figure 15 is a detail fragmentary side view of the rollers.

Figure 16 is a detail diagrammatic cross section of the cable made by the machine.

Figure 17 is a similar view of the core of the cable made by the modification of the machine.

Figure 18 is a section on the line 18—18, Figure 10.

In these drawings, the numerals 83, 83, designate two take off spools, for the core strands $83^z$, $83^z$, also two in number, said strands passing through a central longitudinal perforation 103 of a rotary shaft 104, and thence through between stationary jaws 105, held together by spring 106, one of said jaws being pivoted at 107, said core strands prior to their entry into said perforation passing between toothed rollers 104', positively driven at $104^a$ from the shaft 104, whereby the core strands are positively and evenly fed from their take-off spools without necessity for any tension or brake devices upon said spools, which would be a load upon the machine, and thereby further the tendency of the core strands to twist from the jaws 105 backwardly to said take-off spools is effectually resisted and the two core strands are maintained absolutely straight, which is very desirable in the case of a cable the wrapping of which is formed of twisted wires. The core strands $83^z$, are formed respectively of two wires tightly twisted together, as for instance in the machine of my co-pending application S. No. 641,636, filed May 26, 1923, for machine for manufacturing wire cable.

The shaft 104 has mounted thereon to revolve therewith a plurality of take-off spools 83, from which the wire strands or subsidiary ropes $83^y$ (also double in the present instance as disclosed in my said co-pending application and in a second co-pending application filed June 8, 1923, S. No. 644,254) converge and pass through passages 109 of said shaft, said passages starting circumferentially of said shaft and being first inclined towards each other or converging and then assuming parallel relation longitudinal of the shaft and opening at the end of the shaft, which rotates in bearings 110.

Adjacent said end of the shaft 104 is a stationary frame including the two jaws 105 aforesaid, spaced from the end of said shaft at 111, and between which all of the wires or subsidiary ropes pass including the cores $83^z$, $83^z$, and the concentric strands or ropes $83^y$.

The wire strands or subsidiary ropes being arranged as stated, and the shaft 104 set in rotation to revolve the strands 83$^y$, relative to the jaws 105, (the latter gripping the wire strands or ropes 83$^z$, 83$^y$ and holding them against rotation) the wire strands 83$^y$ surrounding the core strands or ropes 83$^z$ will be twisted around said core, the twisting taking place in the interval 111, between the jaws 105 and the end of the shaft 104, and tension being now exerted upon the wire strands or ropes to continuously pull the same through between said jaws, the wire strands or ropes will be progressively twisted to form a still larger rope 83$^x$.

The larger rope so formed and designated 83$^x$, now passes around guide pulleys 112, and thence reversely through a central longitudinal perforation 113 of a second rotary shaft 114, parallel to the shaft 104, and whereon are mounted to revolve therewith a plurality of take-off spools 83, from which the wire strands or subsidiary ropes 83$^w$, pass in convergence first through guides 115′, and thence being more sharply bent and converging, through longitudinal passages 116 of said shaft, said passages starting circumferentially of said shaft, converging and becoming parallel and terminating and opening at the end of the shaft, which rotates in bearings 117.

Adjacent said end of the shaft 114 is a stationary frame including two opposite jaws 118, held together by springs 119, and spaced from said end of shaft 114 at 120, all of the wire strands or subsidiary ropes 83$^x$, 83$^w$, passing between said jaws at 121, the ropes 83$^w$, being concentric of and surrounding the core 83$^x$, and being twelve in number, the number of take-off spools 83 therefor being similarly twelve in number.

The ropes 83$^w$, 83$^x$, being arranged as stated and the shaft 114 set in rotation and tension exerted upon the strands or ropes to continuously pull the same through between the jaws 118, the latter gripping the ropes or strands to hold them against rotation, the strands 83$^w$ will be twisted around said core, the twisting taking place in the interval 120 between said jaws and the end of said shaft, and a still larger rope 83$^v$ being thereby formed, which enters and passes between the jaws 118 continuously. The wires 83$^w$ may be single strands or composed of two or more strands twisted together, being in the present instance preferably composed of two strands twisted together as in my aforesaid copending application.

The still larger or complete cable formed as stated passes from the jaws 118 under guide pulley 122, thence upwardly over guide pulley 123, thence downwardly around guide pulley 124, carried by block 125 having threaded engagement with screw rod 126, the cable thence passing to the receiving drum 127, whereon it is wound, the rotation of this drum, which is positively driven, as will be presently described, serving to exert the aforesaid tension upon both the core cable 83$^x$ and the complete cable 83$^v$.

The distributor screw rod 126 is threaded in a single direction, as is also the block 125 thereon, and the direction of rotation of said screw rod is automatically reversed at intervals to cause said block to travel back and forth of the drum 127 to properly distribute the cable thereon.

The drive is through main drive shaft 104, having fast and loose pulleys 128, and belted at 129 to parallel shaft 114. Sprocket gearing 130 connects shaft 114 with a shaft 131 the latter having universal joint connection 132 with a shaft 133, the latter carrying a worm 134, in mesh with worm wheel 135, upon the shaft 136 of the receiving drum 127.

The shaft 136 has sprocket gearing connection 137 with the distributor screw rod 126, and a second sprocket gearing connection 138 with said screw rod, one or the other sprocket gearing 137 or 136 being adapted to rotate said threaded distributor rod in one or the other direction at intervals as the block 125 reaches the end of the distributor rod in either direction of movement of said block.

Owing to the fact that the shaft 104 has a single longitudinal central aperture 103 for its entire length and at one end portion thereof a plurality of short longitudinal apertures 109 adjacent to and parallel to each other and to said central aperture, it is possible to form the short apertures 109 completely within and with all walls thereof integral of said shaft 104, and to bring said short apertures 109 closer to the central longitudinal aperture or passage 103, which is of advantage in bringing the wire strands or ropes closer together in parallel relation prior to twisting the same together to form the complete cable.

Owing to the fact that the take-off spools 83 are arranged in series one behind the other around the shaft 104, with their longitudinal axes radial of said shaft, it is made possible to bring said spools closer to each other and to the short apertures or passages 109 of said shaft, whereby the wire strands or ropes passing from said spools to said passages have shorter lengths thereof exposed, which reduces danger of entanglement or breakage and whereby the machine is rendered more compact.

A modification of the invention is shown in the drawings wherein there is provided at the opposite side of the machine from the shaft 104, a series of short stub shafts 141, 141$^a$, 141$^b$, 141$^c$, 141$^d$, in line with each other, the endmost of said stub shafts in rear being provided with two opposite take-off spools 142, removably secured thereon and the wire strands 143 therefrom passing towards each other, as shown in Figure 3 of the drawings to guide pulleys 144, and thence passing forwardly to points diametrically opposite and adjacent said shaft 141 and entering short passages 145 at one end portion of said shaft, said passages starting circumferentially of the shaft and being inclined and then assuming parallel relation longitudinal of the shaft (see Fig. 5) and ending and opening at the forward end of the stub-shaft, the latter rotating in bearings 146.

Adjacent the forward end of the stub-shaft 141 is a stationary frame 147, including two opposite jaws 148, one of which is pivoted at 149, and the jaws being held together yieldably by spring 150, and spaced from the end of the shaft 141 at 151, said wire strands 143 after emerging from the end of the shaft 141, passing between said jaws, and tension being exerted upon the forward ends of the wire strands as will be hereinafter explained to continuously pull the same through between the jaws 148, and the shaft 141 being set in rotation, the result will be that the wire strands will be twisted together in the space 151 to form continuously a core cable 152. This core cable 152 being formed as stated enters immediately a central longitudinal perforation 153 of the next stub-shaft 141$^a$ in line, which shaft is similarly provided with take-off spools 142$^a$, delivering their wire strands 143$^a$ to guide pulleys 144$^a$, to short passages 145$^a$ of the stub shaft and to jaws 148$^a$, all as aforesaid for the first named stub-shaft, the core cable 152 being delivered to said jaws centrally of the wire strands 143$^a$, which latter will be twisted continuously therearound, following rotation of the shaft 141$^a$ and exertion of tension as previously stated, to form a larger cable 152$^a$.

The stub-shafts 141$^b$, 141$^c$, 141$^d$, following consecutively in line are similarly provided respectively with central longitudinal perforations 153$^a$, 153$^b$, 153$^c$, and with take-off spools 142$^b$, 142$^c$, 142$^d$, delivering their wire strands 143$^b$, 143$^c$, 143$^d$ to guide pulleys 144$^b$, 144$^c$, 144$^d$, and to short passages 145$^b$, 145$^c$, 145$^d$, of the said stub-shafts and to jaws 148$^b$, 148$^c$, 148$^d$, related to the stub-shafts.

The cable 152$^a$, is delivered from the jaws 148$^a$, related to the second named stub-shaft immediately to the central longitudinal perforation 153$^a$ of the stub-shaft 141$^b$, next in line, and the wire strands 143$^b$, being twisted therearound in the manner explained, a still larger cable 152$^b$, will be formed, which has in turn the wire strands 143$^d$ twisted therearound following the passage of the cable 152$^b$ through the longitudinal central perforation of the stub-shaft 141$^d$, to form the cable 152$^d$. The wire strands 143$^c$ and 143$^d$, are preferably quadruple, instead of in duplicate, the take-off spools therefor being similarly four in number.

The cable 152$^d$, now passes around guide pulleys 154 and thence around guide pulley 112, adjusted to dotted line position, Figure 1, and is delivered to the central perforation 113 of the shaft 114 aforesaid in substitution of the cable 83$^x$ aforesaid and to form a core for the wire strands or subsidiary ropes 83$^w$ aforesaid, the latter being twisted around the cable 152$^d$ to form a modified form of complete cable 83$^u$, the core 152$^d$ of which is shown in diagram in cross section in Figure 17.

As a result of this modification, a core cable 143 is twisted and fed to the machine by means forming a part of the machine, and the complete cable is built up progressively by concentric layers of twisted strands.

The stub-shafts 141, 141$^a$, 141$^b$, 141$^c$, 141$^d$, are respectively rotated by chain connections 155 with a longitudinal shaft 156 driven at 157 from the shaft 114.

I claim:—

1. In a machine for twisting wire strands or subsidiary ropes to form a still larger rope, means for supplying a plurality of core strands or ropes, means for supplying wire strands or ropes and twisting the same around said core strands to form an outer wrapping, and means for positively and evenly feeding said core strands from their take-off spools adapted to prevent the twisting of the core strands and to hold them straight.

2. In a machine for twisting wire strands or subsidiary ropes to form a still larger rope, means for supplying a plurality of core strands or ropes, means for supplying wire strands or ropes and twisting the same around said core strands to form an outer wrapping, and means including toothed rollers between which said core strands pass for positively and evenly feeding said core strands from their take-off spools and adapted to prevent the twisting of the core strands and to hold them straight.

3. In a machine for twisting wire strands or subsidiary ropes to form a still larger rope, a rotary shaft having a single longitudinal aperture extending centrally thereof and at one end portion a plurality of short longitudinal apertures, two take-off spools having each a core strand or rope extending therefrom through said central aperture, a plurality of take-off spools mounted to revolve with said shaft adjacent to and carrying wire strands or ropes extending through said short aperture wires, means cooperating therewith for exerting tension upon said wire strands or ropes and twisting the last named around said core strands, and means for positively and evenly feeding said core strands from their take-off spools adapted to prevent the twisting of the core strands and to hold them straight.

4. In a machine for twisting wire strands or subsidiary ropes to form a still larger rope, a rotary shaft having a single longitudinal central aperture and at one end a plurality of short longitudinal apertures, two take-off spools having each a core strand or rope extending therefrom through said central aperture, a plurality of take-off spools mounted to revolve with said shaft adjacent to and carrying wire strands or ropes extending through said short apertures, means cooperating therewith for exerting tension upon said wire strands or ropes and twisting the last named around said core strands, and means for positively and evenly feeding said core strands from their take-off spools adapted to prevent the twisting of the core strands and to hold them straight and including toothed rollers between which the core strands pass.

In testimony whereof I affix my signature.

AMASA G. HOOVENS.